United States Patent [19]

Okazaki et al.

[11] Patent Number: 4,723,903

[45] Date of Patent: Feb. 9, 1988

[54] STAMPER FOR REPLICATING HIGH-DENSITY DATA RECORDING DISKS

[75] Inventors: Shinji Okazaki, Urawa; Masaru Ito, Sagamihara, both of Japan

[73] Assignee: Hitachi, Ltd., Tokyo, Japan

[21] Appl. No.: 746,097

[22] Filed: Jun. 18, 1985

[30] Foreign Application Priority Data

Jun. 18, 1984 [JP] Japan ................................. 59-123705

[51] Int. Cl.$^4$ ............................................... B32B 3/00
[52] U.S. Cl. ........................................ 425/385; 204/6; 425/810; 425/DIG. 30; 428/600; 430/326
[58] Field of Search ............... 425/385, 810, DIG. 30; 264/1.3, 106, 107; 156/643, 629, 651, 652, 656, 659.1; 204/4, 5, 6, 292; 430/11, 15, 326, 296, 945; 428/573, 600, 601

[56] References Cited

U.S. PATENT DOCUMENTS

| | | | |
|---|---|---|---|
| 3,532,587 | 10/1970 | Ungar et al. | 428/600 |
| 4,259,433 | 3/1981 | Mizobuchi et al. | 430/326 |
| 4,482,511 | 11/1984 | Komatsubara | 425/810 |
| 4,495,026 | 1/1985 | Herberg | 156/652 |
| 4,519,872 | 5/1985 | Anderson, Jr. et al. | 156/652 |

FOREIGN PATENT DOCUMENTS 108258 5/1984 European Pat. Off. .
3019189 12/1980 Fed. Rep. of Germany .

*Primary Examiner*—Jay H. Woo
*Assistant Examiner*—J. Fortenberry
*Attorney, Agent, or Firm*—Antonelli, Terry & Wands

[57] ABSTRACT

Herein disclosed are a stamper for replicating a high-density data recording disk, wherein there is formed on a substrate a multi-layered metal film, in which a plurality of metals of different kinds are laminated and which has a thickness equal to the depth of a pit, by an etching technique having a selectivity for the kinds of metals and a process for producing that stamper. Since one or more pits having different depths are formed very precisely, the recording density is increased, and the quality of a readout data signal is improved while dispensing with the plating step. As a result, there can be attained an effect that the productivity and economy can be improved.

14 Claims, 34 Drawing Figures

STAMPER FOR REPLICATING HIGH-DENSITY DATA RECORDING DISKS

BACKGROUND OF THE INVENTION

1. Field of the Invention

The present invention relates to a stamper for replicating disks such as optical disks or VHD disks recorded with high-density data in an undulating pattern and a process for producing the same and, more particularly, to a more precise and denser patterning of the stamper.

2. Description of the Prior Art

A data recording disk such as an optical or VHD disk is recorded with data in an undulating pattern. In most cases, moreover, the disk is made of a resin and replicated by means of a stamper. This stamper and its producing process according to the prior art are described both on page 107 of pages 106 to 108 of "Production of Originals of Optical Disks by Lasers", National Technical Report, Vol. 29, No. 5 (October 1983), written by Yoshihiro Okino et al. and on pages 29 to 34 of "Development of Optical Video Disks for Business Use (or for image Location)", Hitachi Review, Vol. 65, No. 10 (1983), written by Koji Akatsu et al.

The precision of the depth of the undulating pattern affects the quality of a readout data signal and constitutes an important factor especially when the data form an image.

The prior art will be described with reference to FIG. 1.

Figure 1A:
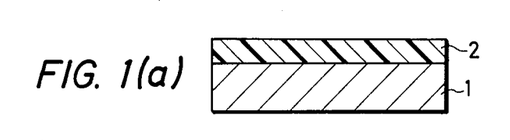
FIG. 1 is a series of diagrams for describing the prior art.
Figure 1B:
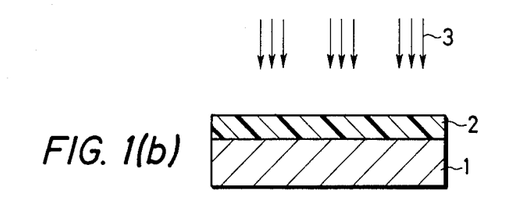
Figure 1C:
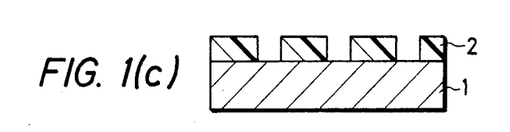
Figure 1D:
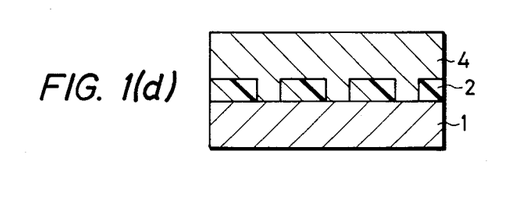

A substrate 1 is coated with a photosensitive resist (i.e., photo resist) film 2 (as shown in FIG. 1(a)), which is then irradiated with an optical pattern 3 having data to be recorded (as shown in FIG. 1(b)) and is subsequently subjected to development. Then, the resist film is formed with such an undulating pattern as is shown in FIG. 1(c). This is called an original disk. This original disk is plated with nickel to produce a stamper 4 (as shown in FIG. 1(d)).

According to this process, the precision of the undulations of the stamper is dependent upon many factors including the thickness and uniformity of the photo resist film and the stability and reproductivity of the recording and recording steps. It is, however, very difficult and requires high technology and great skill to control those factors relating to the photo resist film. The yield of the finished products would be remarkably low even with this high technology and great skill.

The data disk may have a guide track as shallow as 0.07 μm if it is of the write-once type (Reference should be made to page 26 of pages 23 to 34 of "High-Capacity Optical Disk File", Hitachi Review, Vol. 65, No. 10 (1983), written by Yoshito Tsunoda et al.). It is quite difficult to uniformly form that thin photo resist film. On a data disk in which the guide track and the address signal pit have different depths, moreover, it is necessary to give two kinds of depths to the undulating pattern to be formed in the photo resist film. These depths are controlled by the intensities of radioactive rays and by the developing conditions. However, this control is so difficult that the depths are irregular; consequently, the recording density and the S/N ratio of the readout data signal cannot be improved.

Since the precision of the depth deteriorates in the plating step, moreover, a novel invention is wanted for making the data disk highly dense from now on.

SUMMARY OF THE INVENTION

An object of the present invention is concerned with a replicating stamper for producing a data disk recorded with data in an undulating pattern and is to provide both a stamper having such a novel construction as can improve the precision in the undulations and shorten the stamper producing process and a process for producing the same.

According to the present invention, there are proposed both a stamper, which is constructed of a substrate and a metal film coating the substrate and having a thickness equal to the undulating pattern of data, i.e., the depth of the guide track and the address signal pit to make the precision of the depth of the undulating pattern dependent upon the easily controllable thickness of the metal film and to make unnecessary the stamper plating step, and a process for producing that stamper.

The summary of the invention will be described with reference to FIG. 2.

A substrate 1 is coated with a first metal film 5 which is made of a material different from the substrate and which can be etched well by a first etching. The first metal film 5 is coated with a second metal film 6 which can be etched well by a second etching capable of etching a photo resist film and by a third etching. Here, it is necessary to select the first etching such that the substrate 1 cannot be etched well and the third etching such that the first metal film 5 cannot be etched well.

Figure 2A:
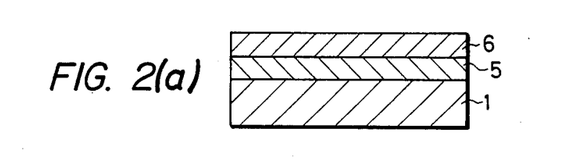
FIGS. 2 and 3 are two series of diagrams for describing the summary of the present invention.
Figure 2B:
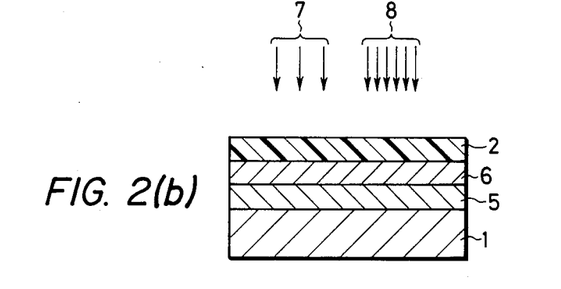
Figure 2C:
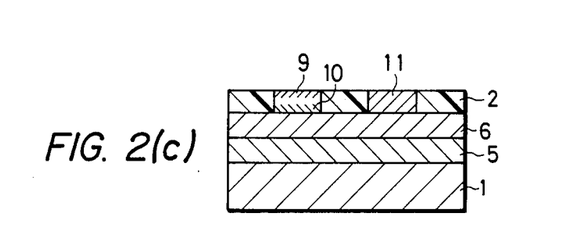
Figure 2D:
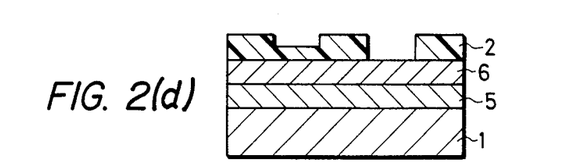

An electron beam resist film 2 is applied to coat the second metal film 6 (as shown in FIG. 2(b)). Next, the resist film is irradiated by an electron beam exposure system with an electron beam having a data pattern (as shown in FIG. 2(b)). At this time, the irradiation is conducted such that an electron beam 7 corresponding to a signal such as the guide track to be recorded with small undulations is made weak whereas an electron beam 8 corresponding to a signal such as the address signal to be recorded with large undulations is made strong. As a result, as shown in FIG. 2(c), such a portion 9 of the resist film having been weakly irradiated as is close to the surface becomes liable to be developed whereas a portion 10 close to the substrate resists development. If an ordinary development is conducted, therefore, the resist film is formed with the stepped undulating pattern, as shown in FIG. 2(d). An etching step to be subsequently conducted will be described in the following with reference to FIG. 3.

Figure 3A:
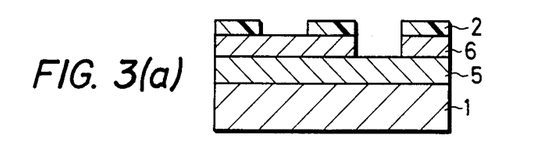
Figure 3B:
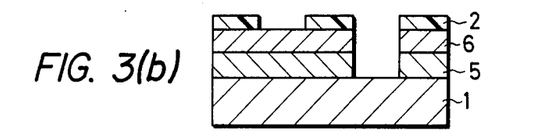
Figure 3C:
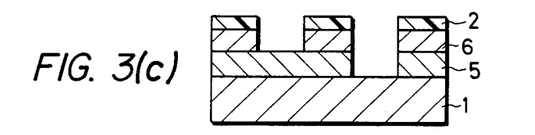
Figure 3D:
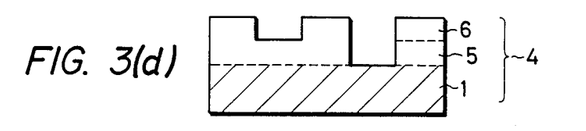

First of all, by the second etching treatment, the corresponding portion of the second metal film 6 is etched, as shown in FIG. 3(a), to expose the corresponding portion of the first metal film 5 to the outside. Simultaneously with this, the resist film is etched so that the resist film portion 10 is removed to expose the corresponding portion of the second metal film to the outside. Next, by the third etching treatment, the exposed portion of the second metal film is removed. When the resist film is finally removed, the stamper is finished, as shown in FIG. 3(d).

In accordance with the combination of the etchings, the kinds of the metals and the order of the steps, the present invention has many modes of embodiment, which will be described in detail in Description of the Preferred Embodiments.

The substrate is generally made of a metal but may be made of a metal coated with another metal, as the case may be. The metal film may be formed of two or more layers, and there may be sandwiched between the layers of each metal film and/or between the metal film and the substrate a film or layer for strengthening the adhesion or damping the stress.

Moreover, it is evident that the stamper may be coated with a protection layer of Au or the like so as to improve the separation property upon the replication and/or the stability and lifetime of the stamper.

Figure 4:
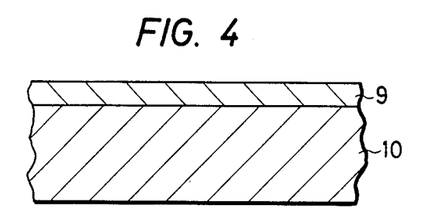
FIG. 4 is a diagram showing one mode of the substrate.

As shown in FIG. 4, there may be used a substrate 10 which has its surface coated with another metal film 9. In this case, it is necessary that the coating metal cannot be well etched by the first etching.

According to the present invention, the undulating pattern formed on the metal film coating the substrate is basically requisite for the stamper but can dispense with the metal plating step, as is different from the process of the prior art. As a result, the present invention is freed from troubles such as degradations at the plating step or productions of inferior stampers. Moreover, the depth of the undulations of the undulating pattern is substantially determined by the thickness of the metal film. Since the control of the metal film thickness is technically easier than that of the photo resist film thickness, the depth of the undulations is more precise than that of the process of the prior art. As a result, the redundancy of the interval of the guide track or the pit can be reduced to make the data disk highly dense. The radioactive rays to be used in the present invention are not limited to electron beams but can be exemplified by various beams or rays such as laser beams, X-rays or ultraviolet rays.

Since the precision of the undulating pattern is improved, according to the present invention, there can be attained effects that the recording density of the data disk can be increased and that the quality of the readout data signal can be improved. Since the plating step can be dispensed with, moreover, there can be attained another effect that the quality and productivity can be improved to produce a high-density data recording disk at a reasonable cost.

DESCRIPTION OF THE PREFERRED EMBODIMENTS

Example 1

This Example 1 will be described with reference to FIG. 5.

A nickel substrate 11 had its surface coated by a sputtering method with a chromium film 15 having a thickness of 30 nm and was then coated by sputtering with a molybdenum film 16 to a thickness of 20 nm. Next, the Mo film 16 was coated by a spin coater with a photosensitive resist (e.g., AZ2400 of Hoechst) to a thickness of about 500 nm. Next, by an electron beam exposure system, a portion 17 corresponding to the guide track was irradiated with an electron beam of 10 $\mu c/cm^2$ whereas a portion 18 corresponding to the address pit was irradiated with an electron beam of 20 $\mu c/cm^2$. By the development with an alkaline developer, the portion 18 irradiated with the electron beam of 20 $\mu c/cm^2$ was removed, whereas the portion irradiated with the electron beam of 10 $\mu c/cm^2$ was removed only at its portion close to the surface, as shown in FIG. 5(b).

Next, the Mo film 16 was etched by ion milling with Ar ions. The ion milling conditions were: a pressure of $7 \times 10^{-3}$ Pa; an ion current of 0.5 mA/cm²; an applied voltage of 750 V; and a milling time of five minutes. At this time, the Cr film 15 was slightly etched, and a resist film 14 was also etched so that the portion 17 irradiated with the electron beam of 10 $\mu c/cm^2$ was removed to give a thickness of 200 nm to the resist film 12, as shown in section in FIG. 5(c). Next, a treatment was conducted by plasma etching using such a chlorine compound gas as could etch chromium well. The conditions for this plasma etching with a CCl₄ gas were: a pressure of 0.5 torr; electric power of 100 W; an etching time of 3 minutes.

Figures 5A, 5D:
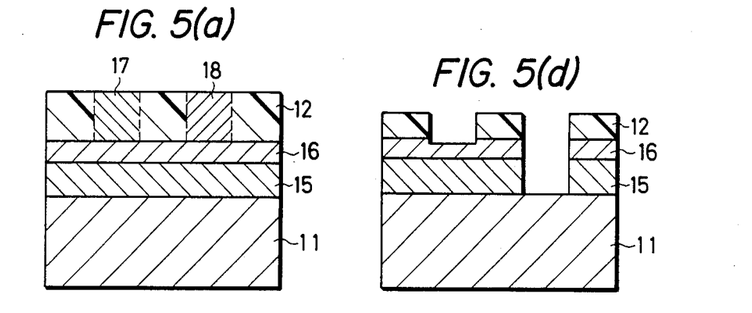
FIG. 5 is a series of diagrams for describing Example 1.
Figures 5B, 5E:
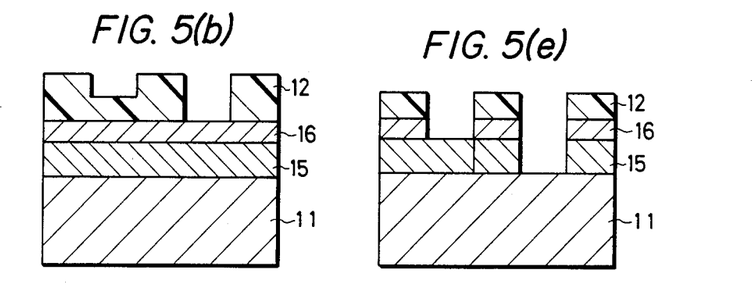
Figures 5C, 5F:
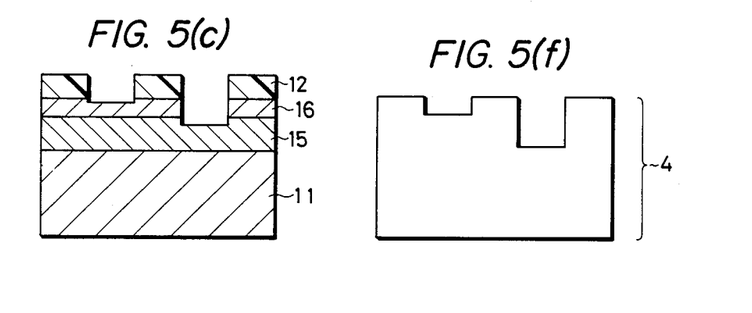

Since the molybdenum, nickel and resist were not etched well by the plasma etching using the chlorine compound gas, the result was as shown in FIG. 5(d). Next, a teatment was conducted under a pressure of 67 Pa, at 50 W for 3 minutes by such a plasma etching using CF₄ (tetra fluoro-carbon) as could etch molybdenum well. Since the CF₄ plasma etching could not etch the chromium well, the result was as shown in FIG. 5(e). Next, the resist film 12 was removed to produce the stamper shown in FIG. 5(f). This stamper had a guide track as deep as 20 nm±2 nm and an address signal pit as deep as 50 nm±5 nm. The stamper having this precision required great skill and high technology and skill and had a remarkably low yield when is was produced by the technique of the prior art.

In the present Example, a similar result was attained even if the order of the chlorine compound plasma etching step and the CF₄ plasma etching step was reversed.

EXAMPLE 2

This Example 2 will be described with reference to FIG. 6.

Figure 6A:
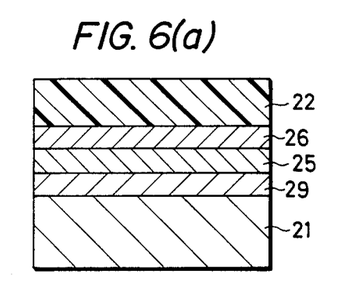
FIG. 6 is a series of diagrams for describing Example 2.
Figure 6B:
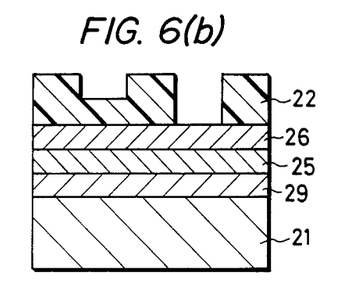
Figure 6C:
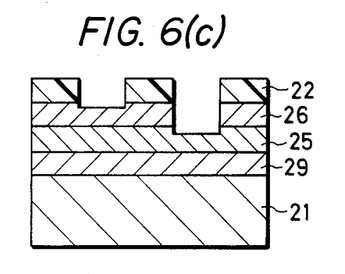
Figure 6D:
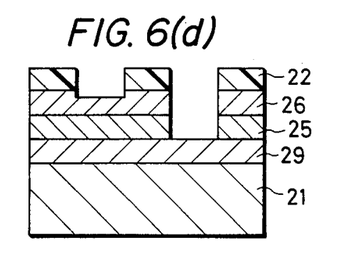
Figure 6E:
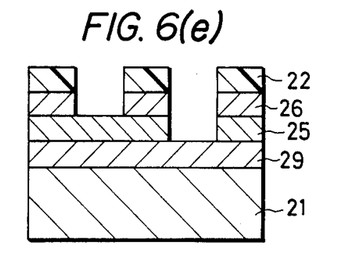
Figure 6F:
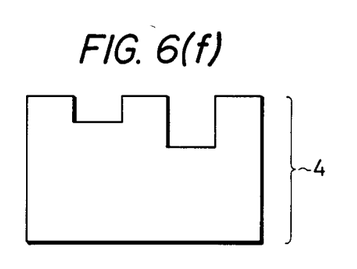

A Ni plate 21 was plated on its surface with a gold film 29. Next, as shown in FIG. 5(a), the Au film 29 was coated with a Ni film 25 and a titanium film 26 by sputtering and further with a photosensitive resist film 22 by the spin coater. Subsequently, irradiation with the electron beams and the development of the resist were conducted likewise as in Example 1, as shown in FIG. 6(b). Next, the ion milling using Ar ions was conducted under a pressure of 7 Pa, with an electric current of 0.6 mA/cm², with an applied voltage of 750 V and for 5 minutes. As a result, the Ti film 26 and the Ni film 25 had their surfaces etched together with the resist film 22, as shown in FIG. 6(c). Next, another etching was conducted by such a CO (carbon monooxide) plasma etching as could etch the nickel well but not the gold. The conditions of this etching were: a pressure of 7 Pa; an electric power of 1 KW; and a treating time of 10 minutes. As a result, the Ni film was etched, as shown in FIG. 6(d). Subsequently, a treatment was conducted by the CF₄ plasma etching which could etch the titanium well. The etching conditions were: a pressure of 67 Pa;

an electric power of 50 W and an etching time of 6 minutes. Since the CF$_4$ plasma etching could not well etch the nickel, the result was as shown in FIG. 6(e). When the resist film was finally removed, a stamper 4 was produced, as shown in FIG. 6(f).

Since, in this case, the Ni film 25 and the Ti film 26 had a thickness of 25 nm, the guide track had a depth of 25 nm±2 nm, and the address signal pit had a depth of 50 nm±3 nm.

EXAMPLE 3

This Example 3 will be described with reference to FIG. 7.

Figure 7A:
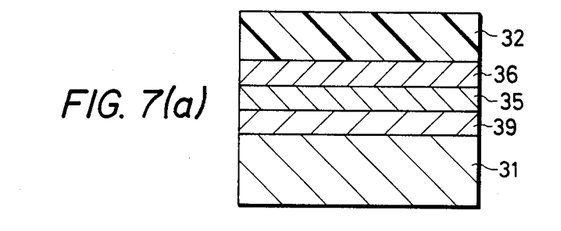
FIG. 7 is a series of diagrams for describing Example 3.
Figure 7B:
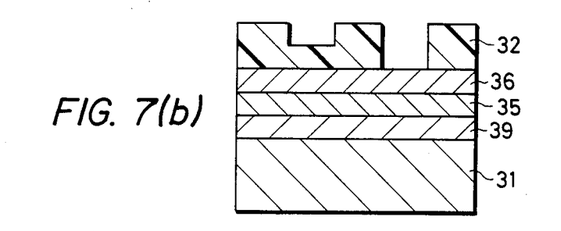
Figure 7C:
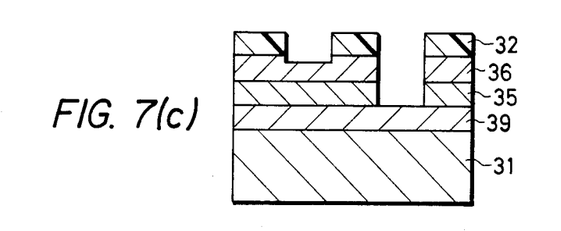

The substrate used was prepared by coating the surface of a Ni plate similar to that of the Example 2 with a Au film 39. This substrate was coated with a Ni film 35 and a Mo film 36, as shown in FIG. 7(a), and further with a photosensitive resist film 32. Next, like the Example 1, the irradiation with electron beams and the development of the resist were conducted, as shown in FIG. 7(b). Next, ion milling using Ar ions was conducted to etch the Mo film and the Ni film simultaneously. The etching conditions were: a pressure of 7 Pa; an ion current of 0.5 mA/cm$^2$; an applied voltage of 750 V; and an etching time of 10 minutes. Since gold is not etched well by ion etching, the result of the ion milling was as shown in FIG. 7(c). After this, by a method like that of the Example 2, the Mo film was etched to remove the resist film 32, thus producing the stamper.

EXAMPLE 4

This Example 4 will be described with reference to FIG. 8.

Figure 8A:
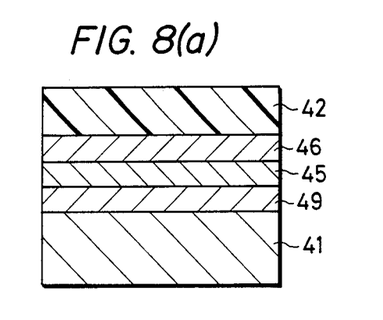
FIG. 8 is a series of diagrams for describing Example 4.
Figure 8B:
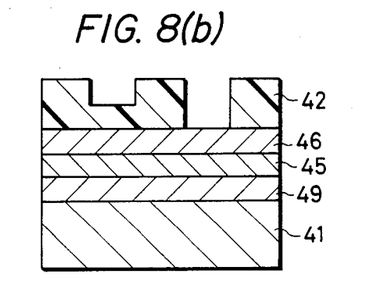
Figure 8C:
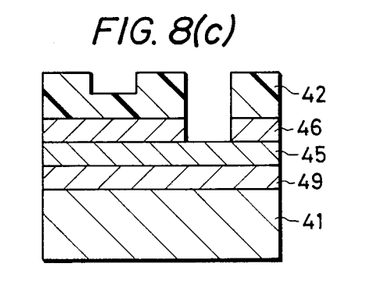
Figure 8D:
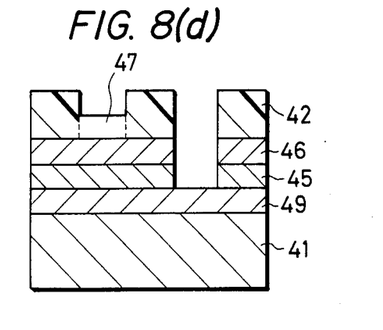
Figure 8E:
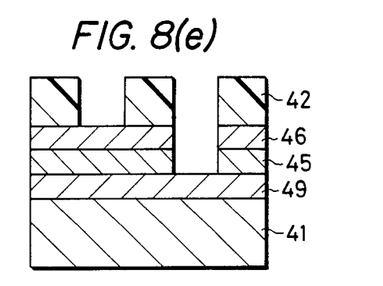
Figure 8F:
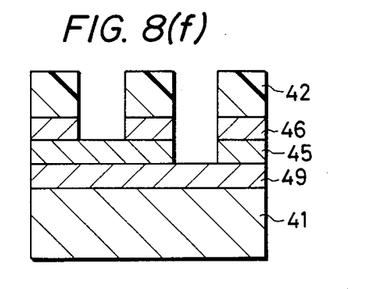

A Cr plate 41 was coated on its surface with a Cr film 49, which was then coated with a Ni film 45 and a Mo film 46 and further with a photosensitive resist film 42, as shown in FIG. 8(a). Next, like the Example 1, the irradiation with the electron beams and the development of the resist were conducted, as shown in FIG. 8(b). Subsequently, the Mo film 46 was etched by the CF$_4$ plasma etching, as shown in FIG. 8(c), and the Ni film 45 was etched by the CO plasma etching, as shown in FIG. 8(d). Next, a resist portion 47, having been irradiated with the electron beam of 10 c/cm$^2$, was removed by the development (as shown in FIG. 8(e)). Subsequently, the Mo film 46 was etched by the CF$_4$ plasma etching, as shown in FIG. 8(f). After this, the resist film 42 was removed to finish the stamper.

EXAMPLE 5

One embodiment of a stamper for replicating digital audio disks will be described in the following.

A Cr substrate was coated by sputtering with a Ni film to a thickness of 150 nm, which was coated by the spin coater with the photosensitive resist (AZ2400 of Hoechst) film having a thickness of 200 nm. Next, the resist film was irradiated by a laser recorder with a pattern to the recorded, and was then developed with an alkaline developer to expose the Ni film portion, which corresponded to the portion for providing the signal pit of the recorded pattern, to the outside. Next, the Ni film was etched by CO plasma etching to remove the exposed portion thereof thereby to form the signal pit. Next, the resist film was removed to produce the stamper. The signal pit had a depth of 150 nm±nm.

What is claimed is:

1. A stamper for replicating a high-density data recording disk, which is recorded with data in pit-shaped and track-shaped undulating patterns, comprising: a substrate; and a plurality of metal films on said substrate, said plurality of metal films including two layers, a first layer on the substrate and a second layer on the first layer, the second layer being formed with track-shaped undulating pattern and the first and second layers being formed with the pit-shaped undulating pattern, and wherein said track-shaped undulating pattern has a depth substantially equal to the thickness of said second layer, the depth of the pit-shaped undulating pattern being substantially equal to the total thickness of the first and second layers.

2. A stamper for replicating a high-density data recording disk according to claim 1, wherein said track-shaped undulating pattern is a guide track for pickup drive.

3. A stamper for replicating a high-density data recording disk according to claim 1, wherein said substrate is made of a metal.

4. A stamper for replicating a high-density data recording disk according to claim 3, wherein the 5. A stamper for replicating a high-density data recording disk according to claim 4, wherein said metal of the substrate and said another metal are different metals.

6. A stamper for replicating a high-density data recording disk according to claim 4, wherein the another metal coated on the surface of said substrate and the metal of said first layer are different metals.

7. A stamper for replicating a high-density data recording disk according to claim 1, wherein said pit-shaped undulating pattern is a pit for an address signal.

8. A stamper for replicating a high-density data recording disk according to claim 2, wherein said pit-shaped undulating pattern is a pit for an address signal.

9. A stamper for replicating a high-density data recording disk according to claim 1, wherein the pit-shaped undulating pattern is a pit for a signal.

10. A stamper for replicating a high-density data recording disk according to claim 2, wherein said pit-shaped undulating pattern is a pit for a signal.

11. A stamper for replicating a high-density data recording disk according to claim 1, wherein the pit-shaped undulating patterns are spaced from the track-shaped undulating patterns.

12. A stamper for replicating a high-density data recording disk which is recorded with data in pit-shaped and track-shaped undulating patterns, made by a process comprising:

the step of coating a substrate with a plurality of metal films, the plurality of metal films including two layers, a first layer on the substrate and a second layer on the first layer; and the step of forming the pit-shaped and track-shaped undulating patterns, the second layer being formed with the track-shaped undulating pattern and the first and second layers being formed with the pit-shaped undulating pattern, such that the depth of the track-shaped undulating pattern is substantially equal to the thickness of said second layer, and the depth of the pit-shaped undulating pattern is substantially equal to the total thickness of the first and second layers.

13. A stamper for replicating a high-density data recording disk according to claim 12, wherein the undulating patterns are patterns formed by removing portions of the plurality of metal films.

14. A stamper for replicating a high-density data recording disk according to claim 13, wherein the removing is performed by etching.

* * * * *